(12) United States Patent
Oyaizu et al.

(10) Patent No.: US 12,338,327 B2
(45) Date of Patent: Jun. 24, 2025

(54) POLYMERIC MATERIAL, PRODUCTION METHOD THEREFOR, AND POLYMERIC MATERIAL COMPOSITION

(71) Applicant: NIPPON SHOKUBAI CO., LTD., Osaka (JP)

(72) Inventors: Kenichi Oyaizu, Tokyo (JP); Motoyasu Hirai, Tokyo (JP); Yushun Sun, Tokyo (JP); Kanta Matsushima, Tokyo (JP); Jun-ichi Nakamura, Osaka (JP); Takeo Kawase, Osaka (JP); Teruhisa Fujibayashi, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 623 days.

(21) Appl. No.: 17/636,279

(22) PCT Filed: Aug. 28, 2020

(86) PCT No.: PCT/JP2020/032729
§ 371 (c)(1),
(2) Date: Feb. 17, 2022

(87) PCT Pub. No.: WO2021/040014
PCT Pub. Date: Mar. 4, 2021

(65) Prior Publication Data
US 2022/0289912 A1    Sep. 15, 2022

(30) Foreign Application Priority Data

Aug. 30, 2019  (JP) ................................. 2019-158993

(51) Int. Cl.
*C08G 75/18* (2006.01)
*C08K 3/22* (2006.01)

(52) U.S. Cl.
CPC ................ *C08G 75/18* (2013.01); *C08K 3/22* (2013.01); *C08K 2003/2244* (2013.01)

(58) Field of Classification Search
CPC ........................... C08G 75/18; C08G 75/0204; C08G 75/0286; C08G 75/20; C08K 3/22; C08K 2003/2241; C08K 2003/2244; C08L 101/02; C08L 81/02; C08L 81/06; C08L 81/08
See application file for complete search history.

(56) References Cited

U.S. PATENT DOCUMENTS

| | | | | |
|---|---|---|---|---|
| 5,144,004 A | * | 9/1992 | Bobsein | C08G 75/0213 528/391 |
| 5,907,029 A | * | 5/1999 | Disch | C08G 75/0295 528/382 |
| 6,013,761 A | * | 1/2000 | Zierer | C08G 75/0295 525/534 |
| 2009/0002613 A1 | | 1/2009 | Kim et al. | |
| 2011/0046285 A1 | | 2/2011 | Imai et al. | |
| 2013/0184428 A1 | | 7/2013 | Fedurco | |
| 2022/0289912 A1 | | 9/2022 | Oyaizu et al. | |

FOREIGN PATENT DOCUMENTS

| | | |
|---|---|---|
| CN | 103222095 | 7/2013 |
| CN | 109608638 | 4/2019 |
| JP | 10-101799 | 4/1998 |
| JP | 2003-335842 | 11/2003 |
| JP | 2007-119756 | 5/2007 |
| JP | 2008-074989 | 4/2008 |
| JP | 2009-523260 | 6/2009 |
| JP | 2009-167316 | 7/2009 |
| JP | 2013-539458 | 10/2013 |
| JP | 2015-168790 | 9/2015 |
| JP | 2017-052834 | 3/2017 |
| JP | 2018-035229 | 3/2018 |
| JP | 2022-530391 | 6/2022 |
| WO | 2017/130798 | 8/2017 |
| WO | 2020/216614 | 10/2020 |
| WO | 2021/040014 | 3/2021 |

OTHER PUBLICATIONS

Synthesis chemistry of Oyaizu Kenichi, high-purity polyphenylene sulfide, ENEOS Technical Review, vol. 59, No. Feb. 1, 2017, pp. 11-14—Please see the JP Office Action for the concise explanation of this document (this document is referred to as Document 3 in the Office Action).
English translation of the Office Action issued in corresponding Japanese Patent Application Serial No. 2023-060064, Apr. 9, 2024, 6 pages.
Shima, Masahide, "Introduction to XPS Analysis for Beginners", Journal of Surface Analysis, vol. 26, No. 1, (2019), pp. 41-48—Abstract.

* cited by examiner

*Primary Examiner* — Ana L. Woodward
(74) *Attorney, Agent, or Firm* — HSML P.C.

(57) ABSTRACT

The present invention aims to provide a polymeric material having reduced coloration in the visible light region, a high refractive index, and low optical dispersion. The present invention relates to a polymeric material having a sulfoxide structure in a main chain.

10 Claims, 6 Drawing Sheets

POLYMERIC MATERIAL, PRODUCTION METHOD THEREFOR, AND POLYMERIC MATERIAL COMPOSITION

TECHNICAL FIELD

The present invention relates to a polymeric material, a method of producing the polymeric material, and a polymeric material composition. Specifically, the present invention relates to a polymeric material having reduced coloration in the visible light region, a high refractive index, and low optical dispersion, a method of producing the polymeric material, and a polymeric material composition.

BACKGROUND ART

Known high refractive index materials include polycarbonate containing an aromatic ring and a polymeric material having a fluorene skeleton. Materials having a large Abbe number, i.e., materials having low optical dispersion, have been required as refractive index regulating materials for improving the light extraction efficiency of LEDs and lens materials for imaging systems. Such materials having a high refractive index and low optical dispersion have been developed, such as a material containing a sulfur molecule or a halogen molecule and a material containing metal oxide nanoparticles.

As for sulfur-containing materials, thermosetting materials have been conventionally developed for materials for spectacle lenses. Molding and processing thermosetting materials however disadvantageously involve an increased number of steps. Alternatively, thermoplastic materials have been required in terms of productivity.

Various thermoplastic materials having a high refractive index and low optical dispersion have been studied. For example, Patent Literature 1 describes a molding material having a repeating unit containing in the main chain a sulfur atom and a benzene ring in which two hydrogen atoms are replaced with methyl groups and having a degree of dispersibility of 3.0 or higher. Such a molding material has excellent moldability in the form of a solution.

Further, for example, Patent Literature 2 discloses a molding material containing a polymer having a repeating unit containing in the main chain a sulfur atom and a benzene ring in which one hydrogen atom is replaced with a methyl group. Such a molding material has excellent moldability in the form of a solution and can provide an optical component having a high refractive index.

CITATION LIST

Patent Literature

Patent Literature 1: JP 2015-168790 A
Patent Literature 2: JP 2017-52834 A

SUMMARY OF INVENTION

Technical Problem

The above-described conventional polymeric materials however have coloration in the visible light region and thus are not sufficiently suitable for optical materials such as an imaging lens. In response to this, the development of polymeric materials has been required that have reduced coloration in the visible region and can be suitably used as optical materials such as an imaging lens.

In view of the current state of the art described above, the present invention aims to provide a polymeric material having reduced coloration in the visible light region, a high refractive index, and low optical dispersion.

Solution to Problem

The present inventors have conducted various studies on polymeric materials having a high refractive index and low optical dispersion and found that a polymer having a sulfoxide structure in the main chain can be a polymeric material having reduced coloration in the visible light region, a high refractive index, and low optical dispersion. The present inventors also found that such a polymeric material can be efficiently produced by polymerizing a monomer component containing a sulfur-containing monomer using a specific oxidant. Thereby, the present invention has been completed.

In other words, the present invention relates to a polymeric material having a sulfoxide structure in a main chain.

Preferably, the polymeric material further includes a substituted aromatic ring structure in the main chain.

Preferably, the polymeric material includes a constituent unit represented by the following formula (1):

[Chem. 1]

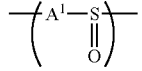

(1)

wherein $A^1$ is a substituted divalent aromatic hydrocarbon group.

Preferably, the constituent unit represented by the formula (1) is a constituent unit represented by the following formula (1-1):

[Chem. 2]

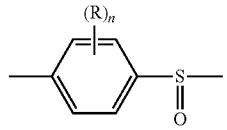

(1-1)

wherein each R is the same as or different from each other and is a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent; and n represents the number of Rs and is an integer of 1 to 4.

Preferably, the polymeric material has an elemental ratio of oxygen atoms O to sulfur atoms S (O/S) of 0.1 to 1.5.

Preferably, the polymeric material has a glass transition temperature of 80° C. to 250° C.

Preferably, the polymeric material is a thermoplastic polymeric material.

Preferably, the polymeric material is for optical applications.

The present invention also relates to a polymeric material composition including:
the polymeric material; and
a metal oxide.

The present invention also relates to a method of producing the polymeric material,
the production method including:
polymerizing a monomer component containing a sulfur-containing monomer to obtain a sulfur-containing polymer; and
oxidizing the sulfur-containing polymer using an oxidant, the oxidant including at least one selected from the group consisting of peroxides and chloric acid.

Advantageous Effects of Invention

The present invention can provide a polymeric material having reduced coloration in the visible light region, a high refractive index, and low optical dispersion. The polymeric material of the present invention can be suitable for materials for optical applications such as imaging lens materials. The polymeric material can be efficiently produced by the method of producing the polymeric material of the present invention.

DESCRIPTION OF EMBODIMENTS

Figure 1:
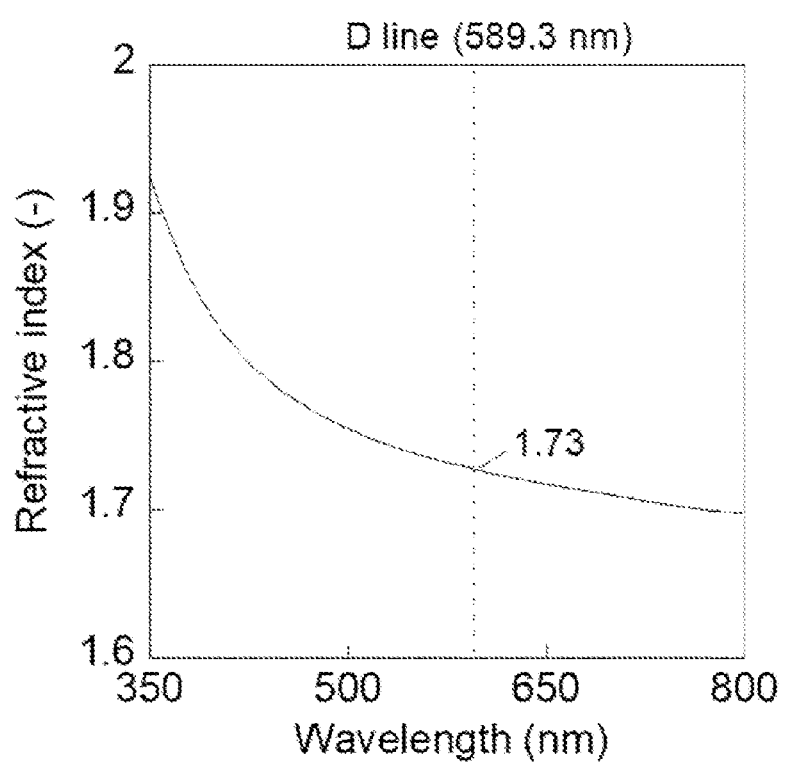
FIG. 1 is a diagram showing measurement data of the refractive index of a polymer of Example 1.
Figure 2:
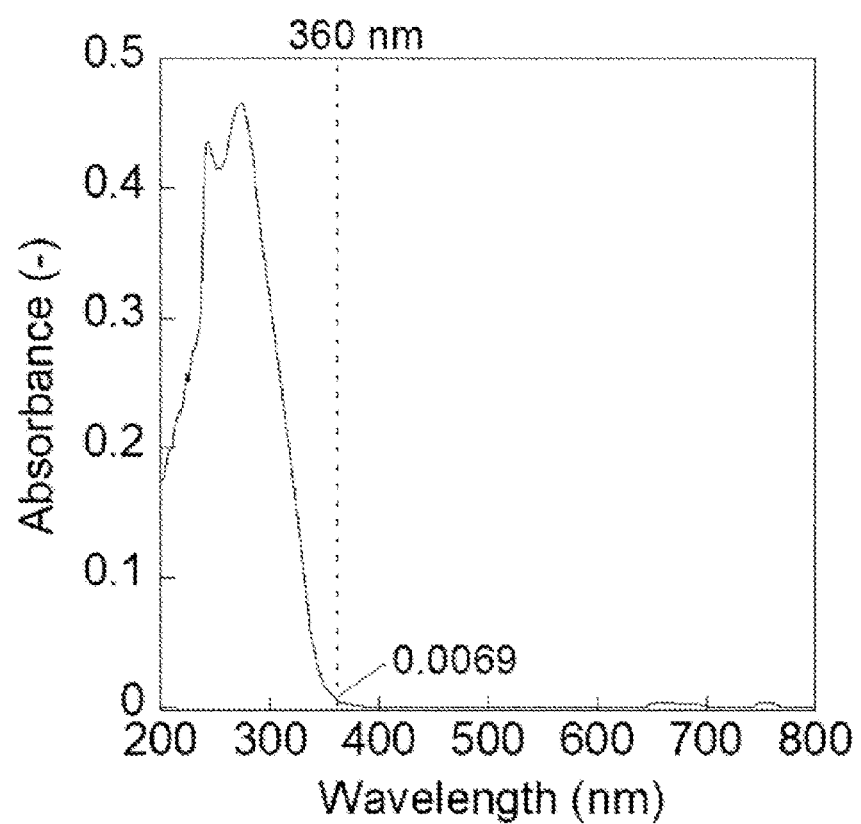
FIG. 2 is a diagram showing measurement data of the absorbance of the polymer of Example 1.
Figure 3:
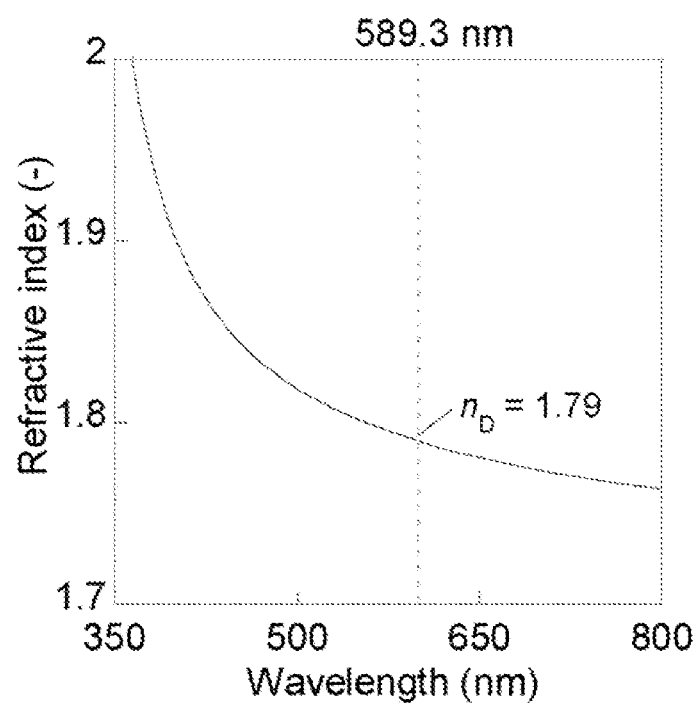
FIG. 3 is a diagram showing measurement data of the refractive index of a polymer of Comparative Example 1.
Figure 4:
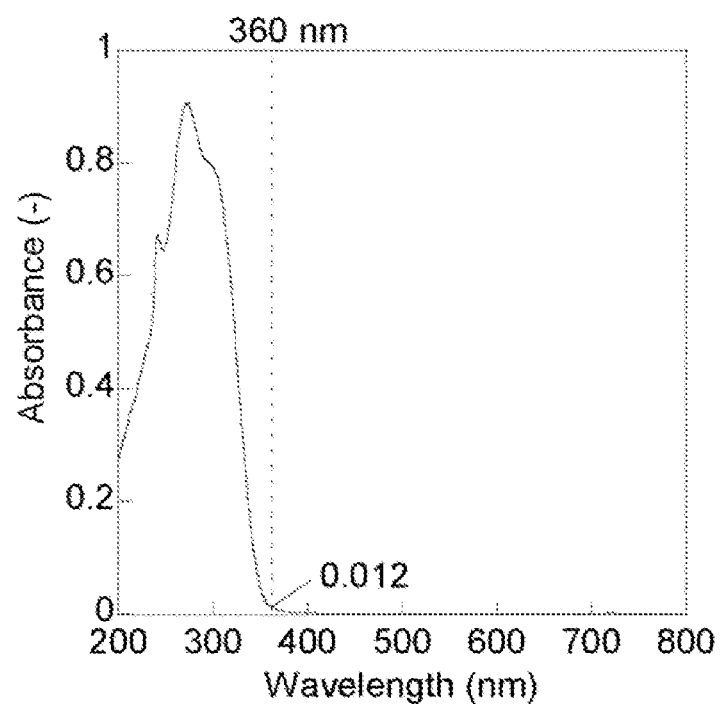
FIG. 4 is a diagram showing measurement data of the absorbance of the polymer of Comparative Example 1.

The present invention is described in detail below.
Any combination of two or more of the following preferred embodiments of the present invention is also a preferred embodiment of the present invention.
1. Polymeric Material
The polymeric material of the present invention has a sulfoxide structure in the main chain. The polymeric material of the present invention having a sulfoxide structure in the main chain has reduced coloration in the visible light region (380 to 800 nm), a high refractive index, and low optical dispersion. This is presumably because introduction of a sulfoxide structure can prevent the reduction of the refractive index and enables cleavage of conjugation between sp2 orbitals (e.g., the visible absorption band disappears due to the n-π* transition of the lone pair on sulfur), leading to an improvement in transparency in the visible light region.
The polymeric material of the present invention has a sulfoxide structure in the main chain. The polymeric material of the present invention is a polymer having a sulfoxide structure in the main chain.
The phrase "comprising/has/having a sulfoxide structure in a/the main chain" means that the polymer has a structure containing at least one sulfinyl group (—S(=O)—) in the main chain.
Preferably, the polymeric material further contains a substituted aromatic ring structure in the main chain. A polymer containing a substituted aromatic ring structure as well as the sulfoxide structure in the main chain of the polymer can provide a polymeric material having excellent transparency owing to reduced crystallinity, a higher refractive index, and lower optical dispersion.

Non-limiting examples of the aromatic ring structure include benzene, naphthalene, anthracene, phenanthrene, tetracene, pentacene, biphenyl, diphenyl, and triphenyl rings. Preferred among these are benzene, naphthalene, anthracene, biphenyl, and triphenyl rings.

In particular, in order to increase the Abbe number of the polymeric material or to further reduce optical dispersion of the polymeric material, the aromatic ring structure preferably contains a C6-C20 aromatic ring structure, more preferably a C6-C18 aromatic ring structure, still more preferably a C6-C12 aromatic ring structure, yet still more preferably a benzene ring.

In the present invention, the phrase "contains an aromatic ring structure in the main chain" means that the aromatic ring structure itself is present in the main chain. For example, the following formula (a) represents the case where a naphthalene ring is present in the main chain. In this case, the main chain contains a C10 aromatic ring structure. Also, for example, the following formula (b) represents the case where a biphenyl ring is present in the main chain. In this case, the main chain contains a C12 aromatic ring structure.

[Chem. 3]

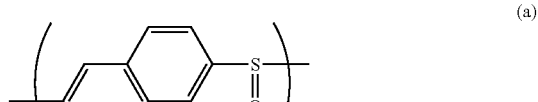

(a)

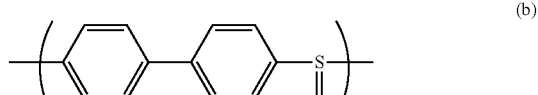

(b)

The following formula (c) represents the case where a benzene ring containing a C6 substituent (phenyl group) is present in the main chain.

[Chem. 4]

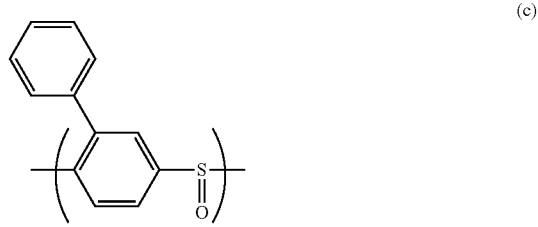

(c)

Examples of the substituent in the aromatic ring structure include a halogen atom, a hydroxy group, an alkyl group, an alkoxy group, an aryl group, an aralkyl group, and a sulfur-containing substituent. The substituent in the aromatic ring structure may further be substituted.

Examples of a preferred substituent in the aromatic ring structure include a halogen atom, a hydroxy group, and an optionally substituted C1-C18 alkyl group, an optionally substituted C1-C18 alkoxy group, an optionally substituted aryl group, an optionally substituted aralkyl group, and an optionally substituted sulfur-containing substituent. In particular, in order to further increase the refractive index of the polymeric material, the substituent in the aromatic ring structure is more preferably an optionally substituted C1-C6 alkyl group or an optionally substituted C1-C6 alkoxy group, still more preferably a C1-C6 alkyl group or a C1-C6 alkoxy group, further more preferably a C1-C3 alkyl group, particularly preferably a methyl group.

The polymeric material preferably contains a constituent unit represented by the following formula (1) (hereinafter, also referred to as "constituent unit (A))".

[Chem. 5]

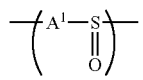
(1)

In the formula, $A^1$ is a substituted divalent aromatic hydrocarbon group.

The divalent aromatic hydrocarbon group for $A^1$ is a divalent group containing the aromatic ring structure, and examples include phenylene, naphthylene, anthrylene, triphenylene, biphenylene, and phenanthrylene groups. In particular, in order to further reduce the optical dispersion of the polymeric material, the divalent aromatic hydrocarbon group is preferably a phenylene group, a naphthylene group, an anthrylene group, a biphenylene group, or a triphenylene group, more preferably a phenylene group.

Examples of a substituent in the divalent aromatic hydrocarbon group include the examples of the substituent in the aromatic ring structure. Examples of a preferred substituent in the divalent aromatic hydrocarbon group include a halogen atom, a hydroxy group, and an optionally substituted C1-C18 alkyl group, an optionally substituted C1-C18 alkoxy group, an optionally substituted aryl group, an optionally substituted aralkyl group, and an optionally substituted sulfur-containing substituent.

Examples of the halogen atom include fluorine, chlorine, bromine, and iodine atoms. Of these, a bromine atom is preferred.

Examples of the alkyl group include methyl, ethyl, n-propyl, isopropyl, n-butyl, s-butyl, t-butyl, and hexyl groups. Of these, a C1-C6 alkyl group is more preferred, and a methyl group is still more preferred.

Examples of the alkoxy group include methoxy, ethoxy, propoxy, isopropoxy, s-butoxy, t-butoxy, pentyloxy, phenoxy, cyclohexyloxy, and benzyloxy groups. Of these, a C1-C6 alkoxy group is preferred, and a methoxy group is more preferred.

Examples of the aryl group include phenyl, naphthyl, and biphenyl groups. Of these, a phenyl group is preferred. The carbon number of the aryl group is preferably 6 to 30, more preferably 6 to 18, still more preferably 6 to 12.

Examples of the aralkyl group include benzyl, phenethyl, phenylpropyl, phenylpentyl, phenylhexyl, and phenyloctyl groups. The carbon number of the aralkyl group is preferably 7 to 14, more preferably 7 to 9.

Examples of the sulfur-containing substituent include a thioalkyl group and a thioaryl group. Of these, a thioalkyl group is preferred. The carbon number of the sulfur-containing substituent is preferably 1 to 8, more preferably 1 to 6, still more preferably 1 to 4.

The alkyl group, alkoxy group, aryl group, aralkyl group, and sulfur-containing substituent may be each further optionally substituted. Preferably, they each may be substituted with an alkyl group in terms of solubility or with a halogen atom or a hydroxy group in terms of the dispersibility of the metal oxide.

In particular, in order to further increase the refractive index and the Abbe number, the substituent in the divalent aromatic hydrocarbon group is more preferably the C1-C18 alkyl group or the sulfur-containing substituent, still more preferably a methyl group or a thioalkyl group, particularly preferably a methyl group.

In order to improve the dispersibility of the metal oxide, the substituent in the divalent aromatic hydrocarbon group is more preferably a hydroxy group or the sulfur-containing substituent, still more preferably a hydroxy group, a thioalkyl group, or a thioaryl group, particularly preferably a hydroxy group.

The divalent aromatic hydrocarbon group may contain any number of substituents. In order to further increase the refractive index of the polymeric material, the number of substituents is preferably small. Specifically, the number of substituents is preferably 1 to 6, more preferably 1 to 3, still more preferably 1.

The constituent unit (A) is preferably a constituent unit represented by the following formula (1-1) in order to further increase the refractive index of the polymeric material and to further reduce the optical dispersion of the polymeric material.

[Chem. 6]

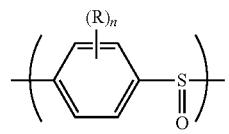
(1-1)

In the formula, each R is the same as or different from each other and is a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent; and n represents the number of Rs and is an integer of 1 to 4.

In the constituent unit represented by the formula (1-1), R is a substituent and is a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent.

The substituents for R in the formula (1-1) are the same as those for the divalent aromatic hydrocarbon group. Specific examples and preferred embodiments thereof are also the same as those for the divalent aromatic hydrocarbon group.

The letter n indicates the number of substituents R and is an integer of 1 to 4. In order to further increase the refractive index, n is preferably 1 to 3, more preferably 1 or 2, still more preferably 1.

In particular, the constituent unit represented by the formula (1-1) is more preferably a constituent unit represented by the following formula (1-1-1):

[Chem. 7]

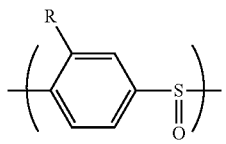

(1-1-1)

wherein R is the same as R in the formula (1-1).

Types and preferred embodiments of the substituent for R in the formula (1-1-1) are the same as those of the substituent for R in the formula (1-1).

In the polymeric material, the proportion of the constituent unit (A) based on 100% by mass of all the constituent units of the polymer is preferably 1 to 100% by mass. In order to further improve the transparency, the proportion is more preferably 5% by mass or more, still more preferably 10% by mass or more, further more preferably 20% by mass or more, particularly preferably 30% by mass or more. In order to further increase the refractive index, the proportion is more preferably 80% by mass or less, still more preferably 60% by mass or less, further more preferably 50% by mass or less.

The polymeric material may contain only one constituent unit (A) or two or more constituent units (A).

The polymeric material may further contain a different constituent unit (B) in addition to the constituent unit (A) as long as the constituent unit (B) does not affect the effects of the present invention. An example of the different constituent unit (B) is preferably a constituent unit represented by the following formula (2):

[Chem. 8]

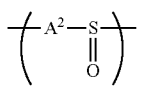

(2)

wherein $A^2$ is a divalent aromatic hydrocarbon group.

$A^2$ in the constituent unit represented by the formula (2) is an unsubstituted divalent aromatic hydrocarbon group.

Examples of the divalent aromatic hydrocarbon group for $A^2$ include the examples of the divalent aromatic hydrocarbon group for $A^1$ in the formula (1).

In particular, the constituent unit represented by the formula (2) is preferably a constituent unit represented by the following formula (2-1).

[Chem. 9]

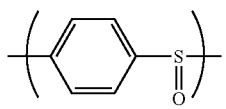

(2-1)

In addition to a constituent unit represented by the formula (2), in order to increase the refractive index, the different constituent unit (B) may be, for example, a constituent unit represented by the following formula (3) or (4):

[Chem. 10]

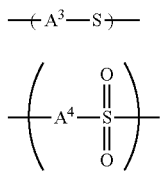

(3)

(4)

wherein $A^3$ and $A^4$ are the same as or different from each other and are each an optionally substituted divalent aromatic hydrocarbon group.

Examples of the divalent aromatic hydrocarbon groups for $A^3$ and $A^4$ in the formulas (3) and (4) include the examples of the divalent aromatic hydrocarbon group for $A^1$ in the formula (1). In particular, the divalent aromatic hydrocarbon groups for $A^3$ and $A^4$ are each preferably a phenylene group, a naphthylene group, an anthrylene group, a biphenylene group, or a triphenylene group, more preferably a phenylene group.

Examples of the substituent in the optionally substituted divalent aromatic hydrocarbon group for $A^3$ or $A^4$ include the examples of the substituent in the divalent aromatic hydrocarbon group for $A^1$ in the formula (1). In particular, in order to further increase the refractive index and the Abbe number, the substituent in the divalent aromatic hydrocarbon group is preferably a methyl group or a thioalkyl group, more preferably a methyl group. In order to improve the dispersibility of the metal oxide, the substituent in the divalent aromatic hydrocarbon group is still more preferably a hydroxy group, a thioalkyl group, or a thioaryl group, particularly preferably a hydroxy group.

When the divalent aromatic hydrocarbon groups for $A^3$ and $A^4$ in the constituent units represented by the formulas (3) and (4) are each a phenylene group containing a substituent, the position of the substituent is preferably the same as the position of the substituent in the phenylene group in the main chain of the constituent unit represented by the formula (1-1-1).

In the polymeric material, the proportion of the constituent unit (B) based on 100% by mass of all the constituent units of the polymer is preferably 0 to 99% by mass, more preferably 10% by mass or more, still more preferably 20% by mass or more, further more preferably 40% by mass or more, particularly preferably 50% by mass or more. In order to further improve the transparency, the proportion is more preferably 95% by mass or less, still more preferably 90% by mass or less, further more preferably 80% by mass or less, particularly preferably 70% by mass or less.

The polymeric material may contain only one constituent unit (B) or two or more constituent units (B). When the polymeric material contains two or more constituent units (B), the proportion of the constituent unit (B) means a combined amount of these.

In the polymeric material, the molar ratio between the constituent unit (A) and the constituent unit (B) ((A):(B)) is preferably 1:0 to 1:100, more preferably 1:0.1 to 1:10, still more preferably 1:1 to 1:5 in order to further increase the transparency and the refractive index.

When the polymeric material contains two or more constituent units (B), the mole of the constituent unit (B) in the molar ratio means a combined amount of two or more constituent units (B).

The polymeric material may be an alternating copolymer, block copolymer, or random copolymer of the constituent unit (A) and the constituent unit (B).

The polymeric material preferably has an elemental ratio (O/S) of oxygen atoms O to sulfur atoms S of 0.1 to 1.5. An elemental ratio within the above range can achieve higher transparency and higher refractive index. In the present invention, the elemental ratio of oxygen atoms O to sulfur atoms S means an elemental ratio (O/S) of oxygen atoms O attached to sulfur atoms S in the main chain to the sulfur atoms S in the main chain.

Specifically, for example, in the constituent unit represented by the formula (1) or (2), the sulfur atoms S in the main chain each mean the sulfur atom S of —SO— in the main chain. In the constituent unit represented by the formula (3), the sulfur atoms S each mean the sulfur atom S of —S— in the main chain, and in the constituent unit represented by the formula (4), the sulfur atoms S each mean the sulfur atom S of —$SO_2$— in the main chain.

Also, specifically, for example, the oxygen atoms attached to the sulfur atoms S in the main chain each mean the oxygen atom 0 of —SO— in the main chain in the constituent unit represented by the formula (1) or (2) and means the oxygen atoms O of —$SO_2$— in the main chain in the constituent unit represented by the formula (4).

In order to achieve higher transparency, the elemental ratio (O/S) is more preferably 0.3 or higher, still more preferably 0.7 or higher, and in order to achieve higher refractive index, the elemental ratio (O/S) is more preferably 1.3 or lower, still more preferably 1.1 or lower.

The elemental ratio can be determined by evaluating and measuring the peak intensities of the is orbital (O1s) of an oxygen atom, the is orbital (C1s) of a carbon atom, and the 2p orbital (S2p) of a sulfur atom using an X-ray photoelectron spectrometer (XPS). Specifically, the elemental ratio can be determined by the method described in the EXAMPLES below.

The polymeric material preferably has a glass transition temperature (Tg) of 80° C. to 250° C. A polymeric material having a glass transition temperature within the above range can be easily molded and processed. In order to increase the heat resistance, the glass transition temperature is more preferably 90° C. or higher, still more preferably 100° C. or higher, and in order to easily mold and process the polymeric material, the glass transition temperature is more preferably 200° C. or lower. The glass transition temperature can be determined using a differential scanning calorimeter (DSC) as follows: a DSC curve is created under the condition that the temperature is increased from room temperature to 250° C. at a temperature-increasing rate of 10° C./min in a nitrogen atmosphere, and evaluation is performed based on the intersection of the baseline and the tangent line at the inflection point of the curve. Specifically, the glass transition temperature can be determined by the method described in the EXAMPLES below.

The polymeric material preferably has a S—O binding energy of 163 eV to 167 eV. A polymeric material having a S—O binding energy within the above range can have higher refractive index and higher transparency. The S—O binding energy can be determined by evaluating the position of the peak top of the 2p3/2 orbital of a sulfur atom measured by X-ray photoelectron spectroscopy (XPS). Specifically, the S—O binding energy can be determined by the method described in the EXAMPLES below.

The polymeric material preferably has a weight average molecular weight (Mw) of 500 to 10000000. A polymeric material having a weight average molecular weight within the above range can be suitably used as an optical material. In order to improve the mechanical properties, the weight average molecular weight is more preferably 1000 or greater, still more preferably 3000 or greater, further more preferably 10000 or greater, and in order to reduce the melt viscosity, Mw is more preferably 1000000 or smaller, still more preferably 100000 or smaller.

The polymeric material preferably has a degree of dispersibility (weight average molecular weight/number average molecular weight) of 1 to 10. A polymeric material having a degree of dispersibility within the above range can be easily molded. In order to further improve the moldability, the degree of dispersibility is more preferably 5 or lower, still more preferably 3 or lower.

In the present invention, the weight average molecular weight and the number average molecular weight can be measured by a gel permeation chromatography (GPC) method. Specifically, they can be determined by the method described in the EXAMPLES below. The degree of dispersibility can be determined by dividing the weight average molecular weight by the number average molecular weight.

The polymeric material preferably has a refractive index of 1.69 or higher. A polymeric material having a refractive index within the above range can be suitably used for various applications, including optical materials (components), materials of machine parts, materials of electric and electronic parts, materials of automobile parts, materials for civil engineering and construction, molding materials, materials of paints and adhesives, and the like.

The refractive index is more preferably 1.7 or higher, still more preferably 1.71 or higher. The refractive index can be determined as follows: a 50-nm thick film is produced as a measurement sample using the polymeric material and is subjected to measurement of refractive index using the Na D line (589 nm) with a spectroscopic ellipsometer UVISEL (available from HORIBA Scientific Co., Ltd.). Specifically, the refractive index can be determined by the method described in the EXAMPLES below.

The polymeric material preferably has an Abbe number of 10 or greater. A polymeric material having an Abbe number within the above range has low optical dispersion and can be used as an optical material suitable for lenses. The Abbe number is more preferably 15 or greater, still more preferably 18 or greater, further more preferably 20 or greater. In order to control the optical dispersibility, the Abbe number is preferably 60 or smaller, more preferably 55 or smaller.

The Abbe number can be determined as follows: a film is produced using the polymeric material in the same manner as for the above-described refractive index and the film is subjected to measurement of refractive indexes at the D line (589.3 nm), the F line (486.1 nm), and the C line (656.3 nm) with the spectroscopic ellipsometer, and the Abbe number is determined using the following equation. Specifically, the Abbe number can be determined by the method described in the EXAMPLES below.

$$\text{Abbe number } (v_D) = (n_D - 1)/(n_F - n_C)$$

In the formula, $n_D$, $n_F$, and $n_C$ are the refractive indexes at the Fraunhofer D line (589.3 nm), the Fraunhofer F line (486.1 nm), and the Fraunhofer C line (658.3 nm), respectively.

The polymeric material preferably has a visible transmittance of 70% or higher. A polymeric material having a visible transmittance within the above range can be suitably used as an optical material. The visible transmittance is more preferably 80% or higher, more preferably 85% or higher, still more preferably 88% or higher.

The visible transmittance is a parallel transmittance and can be determined as follows: a thin film made of the polymeric material having a thickness of 0.02 mm is used or the thickness is standardized to 0.02 mm, measurement is performed in the range of 400 nm to 700 nm with air as a reference using a spectrophotometer (e.g., UV-visible-infrared spectrophotometer V-700 series available from JASCO Corporation) without an integrating sphere, and the lowest value of the transmittance is evaluated.

In order to increase the visible light permeability, the polymeric material preferably has an absorbance at a wavelength of 360 nm of 0.010 or lower. The absorbance is more preferably 0.008 or lower, still more preferably 0.005 or lower.

The absorbance can be determined by measuring the absorbance of a solution of the polymeric material in a chloroform solution using an UV-visible-infrared spectrophotometer (e.g., V-700 series available from JASCO Corporation). Specifically, the absorbance can be determined by the method described in the EXAMPLES below.

The polymeric material of the present invention is preferably a thermoplastic polymeric material. The polymeric material of the present invention has, as described above, reduced coloration in the visible light region, a high refractive index, and low optical dispersion and also has excellent properties such as heat resistance. Thus, the polymeric material is useful as materials for various applications described later, including optical materials such as lenses. These applications require thin film formability capable of achieving excellent film thickness uniformity and high-precision molding processability capable of achieving complicated shapes. The polymeric material when being thermoplastic can achieve processability satisfying these requirements through a simple process.

<Method of Producing Polymeric Material>

A method of producing the polymeric material of the present invention may be any method that can produce the above-described polymer having a sulfoxide structure in the main chain, and a known method can be used to polymerize a monomer component containing a sulfur-containing monomer.

In particular, in order to efficiently produce the polymer having a sulfoxide structure in the main chain polymer, the method preferably includes polymerizing a monomer component containing a sulfur-containing monomer to obtain a sulfur-containing polymer and oxidizing the sulfur-containing polymer using an oxidant, the oxidant including at least one of a peroxide or chloric acid. The present invention also encompasses such a method of producing the polymeric material including polymerizing a monomer component containing a sulfur-containing monomer to obtain a sulfur-containing polymer and oxidizing the sulfur-containing polymer using an oxidant, the oxidant including at least one selected from the group consisting of peroxides and chloric acid.

The following describes these steps.

Step (1)

The method of producing the polymeric material of the present invention includes polymerizing a monomer component containing a sulfur-containing monomer to obtain a sulfur-containing polymer.

The sulfur-containing monomer may be any monomer that contains a sulfur atom. In the production method of the present invention, the sulfur-containing polymer is preferably obtained by oxidative polymerization of a sulfur-containing monomer. Examples of a preferred sulfur-containing monomer that can provide a sulfur-containing polymer through oxidative polymerization include a disulfide compound and a thiol compound. Specific examples of a more preferred sulfur-containing monomer include a diaryl disulfide compound represented by the following formula (5) and a thioaryl compound represented by the following formula (6):

[Chem. 11]

$$A^5—S—S—A^6 \quad (5)$$

$$A^5—SH \quad (6)$$

wherein $A^5$ and $A^6$ are the same as or different from each other and are each a substituted monovalent aromatic hydrocarbon group.

The monovalent aromatic hydrocarbon group for $A^5$ or $A^6$ is the same as a group prepared by converting the divalent aromatic hydrocarbon group for $A^1$ in the formula (1) into the corresponding monovalent group.

The substituent in the monovalent aromatic hydrocarbon group for $A^5$ or $A^6$ and the number of the substituents are the same as the substituent in the divalent aromatic hydrocarbon group for $A^1$ in the formula (1) and the number of the substituents.

The diaryl disulfide compound is preferably a compound represented by the following formula (5-1).

The thioaryl compound is preferably a compound represented by the following formula (6-1).

[Chem. 12]

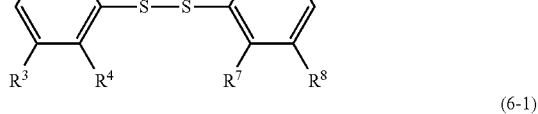

(5-1)

(6-1)

In the formulas (5-1) and (6-1), $R^1$, $R^2$, $R^3$, $R^4$, $R^5$, $R^6$, $R^7$, and $R^8$ are the same as or different from each other and are each a hydrogen atom, a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent, at least one selected from the group consisting of $R^1$ to $R^4$ and $R^5$ to $R^8$ is a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent.

The optionally substituted C1-C18 alkyl group, the optionally substituted C1-C18 alkoxy group, the optionally substituted aryl group, the optionally substituted aralkyl group, and the optionally substituted sulfur-containing substituent are preferably the same as those for R in the formula (1-1).

Of these, the sulfur-containing monomer is preferably a diphenyl disulfide compound represented by the following formula (7):

[Chem. 13]

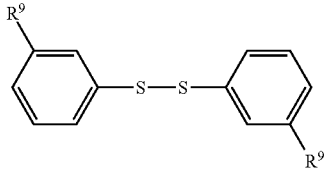

(7)

wherein $R^9$ is a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent.

$R^9$ is preferably a C1-C3 alkyl group, more preferably a methyl group.

The disulfide compound can also be prepared by oxidation of a thiol compound. Thus, in the step (1) of polymerization, a thiol compound can be used as a precursor of the disulfide compound. The disulfide compound can be obtained by oxidatively coupling two thiol compound molecules.

The thiol compound may be any compound that serves as a precursor of the disulfide compound, and is preferably a thiophenol compound represented by the formula (6-1), more preferably a thiophenol compound represented by the following formula (8):

[Chem. 14]

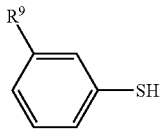

(8)

wherein $R^9$ is the same as $R^9$ in the formula (7).

The oxidation of a thiol compound to obtain the disulfide compound may be performed by any method and can be performed by a known method such as oxidation using hydrogen peroxide, iodine, or the like.

The sulfur-containing monomer may further contain at least one of a compound containing an unsubstituted disulfide compound or an unsubstituted thiol compound. Examples of a preferred unsubstituted disulfide compound include diphenyl disulfide. Examples of a preferred unsubstituted thiol compound include benzenethiol. The amounts of the unsubstituted disulfide compound and the unsubstituted thiol compound to be added may be appropriately set such that the proportions of the constituent units in the polymeric material fall within the above-described desired ranges.

The monomer component used to provide the sulfur-containing polymer may contain one sulfur-containing monomer or two or more sulfur-containing monomers.

The step (1) of polymerization is preferably oxidative polymerization. The oxidative polymerization is not limited and can be performed by a known method such as oxidative polymerization using a quinone compound or oxidative polymerization using a metal compound such as a vanadium compound. In particular, in order to further improve the transparency, the oxidative polymerization is preferably performed using at least one of a quinone oxidant represented by the following formula (9) or a quinone oxidant represented by the following formula (10). A metal compound is preferably used because the amount thereof to be used relative to the monomer component is small and the amount of waste can be reduced.

[Chem. 15]

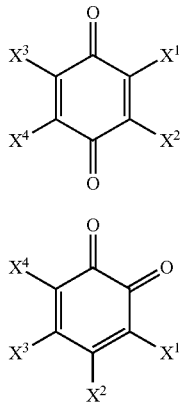

In the formulas (9) and (10), $X^2$, $X^2$, $X^3$, and $X^4$ are the same as or different from each other and are each a hydrogen atom, a chlorine atom, a bromine atom, a nitrile group, a C1-C8 alkyl group, an aralkyl group, or an aryl group. $X^2$ and $X^2$ may be bonded to each other to form a C6-C8 ring and $X^3$ and $X^4$ may be bonded to form a C6-C8 ring.

Specific examples of the quinone oxidant for the formula (9) or (10) include 2,3-dichloro-5,6-dicyano-p-benzoquinone (DDQ), 2,3,5,6-tetrachloro-p-benzoquinone (chloranil), 2,3,5,6-tetrabromobenzoquinone (bromanil), 2,3,5,6-tetrafluoro-p-benzoquinone, anthraquinone, 1,4-naphthoquinone, 2,3-dichloro-1,4-naphthoquinone, 2,3-dibromo-1,4-naphthoquinone, 2,3-dicyano-1,4-naphthoquinone, 3,4,5,6-tetrachloro-o-benzoquinone (o-chloranil), 3,4,5,6-tetrabromo-o-benzoquinone (o-bromanil), and 3,4,5,6-tetrafluorobenzoquinone. Of these, DDQ is preferred because it is highly oxidative and easily available. The quinone oxidant may include one or two or more of these quinone oxidants.

The quinone oxidant is preferably added in an amount of 0.1 to 3 mol, more preferably 0.8 to 1.5 mol, still more preferably 0.9 to 1.1 mol per mole of the sulfur-containing monomer used.

When the quinone oxidant is used, an acid may further be added. When the quinone oxidant acts as an oxidant, the quinone compound is converted into a dianion of the hydroquinone compound. The acid can stabilize such a dianion, and the oxidative power can be maintained.

Non-limiting examples of the acid include sulfuric acid, acetic acid, methanesulfonic acid, benzenesulfonic acid, toluenesulfonic acid, trifluoromethanesulfonic acid, 1,1,2,2-tetrafluoroethanesulfonic acid, trifluoroacetic acid, perfluoropropionic acid, and perfluorobutyric acid. Of these, in order to increase the acidity, trifluoroacetic acid is preferred. Each of the acids may be used alone or in combination of two or more of these.

The acid is preferably added in an amount of 10 to 1000 mol, more preferably 50 to 500 mol, still more preferably 80 to 120 mol per 100 mol of the whole amount of the quinone oxidant added.

The reaction may be performed at any temperature at which the polymerization can proceed. In order to allow the oxidative polymerization to easily proceed, the reaction temperature is preferably 0° C. to 200° C., more preferably 10° C. or higher, still more preferably 15° C. or higher. In order to reduce the side reaction, the reaction temperature is more preferably 180° C. or lower, still more preferably 150° C. or lower.

The reaction may be performed for any duration, and the reaction duration is usually 0.1 to 100 hours, preferably 1 to 80 hours, more preferably 5 to 50 hours, still more preferably 10 to 24 hours.

In the step (1) of polymerization reaction, a solvent may be used. Examples of a preferred solvent include dichloromethane, chloroform, carbon tetrachloride, 1,2-dichloroethane, tetrachloroethylene, 1,1,2,2-tetrachloroethane, nitromethane, nitrobenzene, chlorobenzene, 1,2-dichlorobenzene, 1,3-dichlorobenzene, N-methylpyrrolidone, tetrahydrofuran, and ethyl acetate.

In the step (1) of polymerization reaction, the monomer component containing a sulfur-containing monomer may be sequentially added during the polymerization reaction.

In the step (1), multistage polymerization may be performed in which, for example, the above-described thiol compound is oxidatively polymerized to obtain a disulfide compound, and the disulfide compound is then oxidatively polymerized.

Step (2)

The method of producing the polymeric material of the present invention includes oxidizing the sulfur-containing polymer obtained in the step (1) using a specific oxidant.

The oxidant includes at least one selected from the group consisting of peroxides and chloric acid. Use of such a specific oxidant can achieve moderate oxidation of most of the sulfur atoms (—S—) in the main chain into sulfoxides (sulfinyl groups) (—SO—) without being oxidized into sulfonyls (—$SO_2$—).

Examples of the peroxide include m-chloroperbenzoic acid, hydrogen peroxide, ammonium persulfate, sodium persulfate, peracetic acid, and t-butylhydroperoxide.

The oxidant is preferably a peroxide, more preferably m-chloroperbenzoic acid or hydrogen peroxide among these because they are soluble in the same solvent as the solvent capable of dissolving the sulfur-containing polymer. In order not to use water in which the polymer precipitates and in order to prevent oxidation to a sulfoxide caused by excess oxidant, the oxidant is still more preferably m-chloroperbenzoic acid.

When hydrogen peroxide is used as the peroxidant, in order to reduce precipitation of the polymer, a phase transfer catalyst such as trifluoroacetone is preferably used with a reduced amount of water.

The oxidant may be added in any amount that allows desired oxidation reaction of the sulfur atoms to proceed, and usually, the amount is preferably 0.1 to 10 mol, more preferably 0.5 to 5 mol, still more preferably 0.8 to 1.5 mol per mole of sulfur atom in the sulfur-containing polymer.

The oxidation reaction may be performed at any reaction temperature at which desired oxidation reaction proceeds. In order to allow the oxidation reaction to easily proceed, the reaction temperature is preferably 0° C. to 200° C., more preferably 10° C. or higher, still more preferably 15° C. or higher. In order to reduce the side reaction, the reaction temperature is more preferably 180° C. or lower, still more preferably 150° C. or lower.

The reaction may be performed for any duration, and the reaction duration is usually 0.1 to 100 hours, preferably 1 to 80 hours, more preferably 5 to 50 hours, still more preferably 10 to 24 hours.

In the step (2) of oxidation reaction, a solvent may be used. Examples of a preferred solvent include the solvents used in the step (1) of polymerization.

The polymer obtained in the step (2) is preferably washed because it contains residual acid or the like. Non-limiting examples of the washing method include washing using water, an acid, a base, or the like. The polymer may be filtered or washed with a solvent to remove unreacted monomers. The solvent may be any solvent and may be the same as the reaction solvent.

The method of producing the polymeric material may include a different step in addition to the steps (1) and (2). Examples of the different step include aging, neutralization, dilution, drying, concentration, and purification. These steps may be performed by known methods.

2. Polymeric Material Composition

The polymeric material of the present invention may be combined with a different component to produce a polymeric material composition. The different component may be any component and may be appropriately selected from known components according to the purpose and use of the polymeric material composition. In particular, a combination of the polymeric material with a metal oxide remarkably improves the transparency. The present invention also encompasses the polymeric material composition containing the polymeric material and a metal oxide.

The polymeric material is preferably contained in an amount of 10 to 100% by mass in 100% by mass of the solids of the polymeric material composition. In order to further improve the permeability and the refractive index, the amount of the polymeric material is more preferably 20% by mass or more, still more preferably 50% by mass or more. In order to keep the viscosity of the polymeric material low at the time of injection, the amount of the polymeric material is preferably 99% by mass or less, still more preferably 95% by mass or less, further more preferably 85% by mass or less, particularly preferably 80% by mass or less, most preferably 60% by mass or less.

Examples of the metal oxide include titanium oxide; silicon dioxide; zirconium oxide; aluminum oxide; magnesium oxide; perovskite-type oxides such as barium titanate, barium strontium titanate, strontium titanate, barium zirconium strontium titanate, barium zirconium titanate, and lead zirconate titanate; boron nitride; aluminum hydroxide; and aluminum titanate. Each of these may be used alone or in combination of two or more of these. In particular, in order to further improve the transparency and to provide a low linear expansion polymeric material composition, zirconium oxide, titanium oxide, and silicon dioxide are more preferred, and in order to improve the refractive index of the polymeric material composition, zirconium oxide and titanium oxide are more preferred. In order to provide a polymeric material composition that has high relative permittivity and can be suitably used as a ferroelectric material or a piezoelectric material, perovskite-type oxides are preferred. In order to provide a polymeric material composition that has high thermal conductivity and can be suitably used as a heat dissipating material, boron nitride, aluminum hydroxide, and aluminum titanate are preferred.

The metal oxide may have any shape and may have an indefinite shape, a particle shape, a plate shape, or a fibrous shape, for example. It has preferably a particle shape.

The metal oxide preferably has an average particle size of 1 nm or greater and 1000 nm or smaller. A metal oxide having an average particle size within the above range can improve the permeabilities of the visible light region and the infrared region. The average particle size of the metal oxide is more preferably 5 nm or greater, still more preferably 10 nm or greater. It is more preferably 100 nm or smaller, still more preferably 50 nm or smaller.

The average particle size is determined as follows: the metal oxide is observed by SEM (magnification: 1000 to 100000 times, preferably 10000 times), the image obtained is analyzed to determine the particle sizes (circular area equivalent diameters) of about 10 to 1000 particles (primary particles), and the 50% particle size is evaluated based on the particle size distribution based on the number. The image can be analyzed with known image analysis software (e.g., Mac-View available from Mountech Co., Ltd.).

The metal oxide may be contained in any amount, and the amount thereof may be appropriately set according to the purpose and use of the polymeric material composition. For example, in order to further improve the transparency and to achieve low linear expansion, the amount of the metal oxide is preferably 10 parts by mass or more, still more preferably 30 parts by mass or more, further more preferably 50 parts by mass or more, particularly preferably 70 parts by mass or more, most preferably 80 parts by mass or more relative to 100 parts by mass of the polymeric material. In order to reduce the melt viscosity during preparation of a resin molded article, the amount of the metal oxide is preferably 90 parts by mass or less, more preferably 80 parts by mass or less, still more preferably 70 parts by mass or less, further more preferably 50 parts by mass or less relative to 100 parts by mass of the polymeric material.

The polymeric material composition may contain a different component in addition to the metal oxide, and examples thereof include pigments, dyes, antioxidants, UV absorbers, IR blocking agents, reactive diluents, light stabilizers, plasticizers, non-reactive compounds, chain transfer agents, thermal polymerization initiators, anaerobic polymerization initiators, polymerization inhibitors, inorganic fillers, organic fillers, adhesion improvers such as coupling agents, heat stabilizers, antibacterial and antifungal agents, flame retardants, matting agents, defoamers, leveling agents, wetting and dispersing agents, precipitation inhibitors, thickeners, anti-sagging agents, anti-flooding agents, emulsifiers, anti-slip and anti-scratch agents, anti-skinning agent, drying agents, antifouling agents, antistatic agents, conductive agents (electrostatic additives), and solvents. Each of these components may be used alone or in combination of two or more of these. These components may be appropriately selected from known ones. The amount of these can be appropriately set.

When used for an optical material, the polymeric material composition may appropriately contain a different component depending on the applications of the optical material. Specific examples of a suitable different component include UV absorbers, IR blocking agents, reactive diluents, pigments, detergents, antioxidants, light stabilizers, plasticizers, non-reactive compounds, and defoamers.

The polymeric material composition preferably has a glass transition temperature (Tg) of 80° C. to 250° C. A polymeric material composition having a glass transition temperature within the above range can be easily molded and processed. In order to increase the heat resistance, the glass transition temperature is more preferably 90° C. or higher, still more preferably 100° C. or higher. In order to achieve easy molding and processing, Tg is more preferably 200° C. or lower.

The glass transition temperature can be determined by the same method as for the glass transition temperature of the polymeric material described above.

The polymeric material composition preferably has a refractive index of 1.69 or higher. A polymeric material composition having a refractive index within the above range can be suitable for an optical material or the like. The refractive index is more preferably 1.70 or higher, still more preferably 1.71 or higher.

The refractive index can be determined by the same method as for the refractive index of the polymeric material described above.

The polymeric material composition preferably has an Abbe number of 10 or greater. A polymeric material composition having an Abbe number within the above range has low optical dispersion and can be an optical material suitable for lenses. The Abbe number is more preferably 15 or greater, still more preferably 18 or greater, further more preferably 20 or greater. In order to control the optical dispersibility, the Abbe number is more preferably 60 or smaller, still more preferably 55 or smaller.

The Abbe number can be determined by the same method as for the Abbe number of the polymeric material described above.

The polymeric material composition preferably has a visible transmittance of 70% or higher. A polymeric material composition having a visible transmittance within the above range can be suitably used for an optical material. The visible transmittance is more preferably 80% or higher, more preferably 85% or higher, still more preferably 88% or higher.

The visible transmittance is a parallel transmittance and can be determined by the same method as for the visible transmittance of the polymeric material described above.

The polymeric material composition may be produced by any method and may be produced by mixing the polymeric material, the metal oxide, and an optional different component. The mixing may be performed with a known means including a bead mill, a roll mill, a ball mill, a jet mill, a kneader, or a blender.

The polymeric material of the present invention is preferably a thermoplastic polymeric material as described above, and the polymeric material composition containing the polymeric material is also preferably thermoplastic. The polymeric material composition of the present invention containing the polymeric material has reduced coloration in the visible light region, a high refractive index, low optical dispersion, and excellent properties including heat resistance. Also, when the polymeric material composition is thermoplastic, it has good molding processability and can be easily used for various applications that require the properties described above.

3. Applications

The polymeric material and the polymeric material composition of the present invention have reduced coloration in the visible light region, a high refractive index, and low optical dispersion, and are thus suitably used in applications that require reduced coloration in the visible light region, a high refractive index, and low optical dispersion.

The polymeric material and the polymeric material composition of the present invention are preferably used for optical applications, and specific examples thereof include imaging lenses, optical materials (components), materials of machine parts, materials of electric and electronic parts, materials of automobile parts, materials for civil engineering and construction, molding materials, and materials of paints and adhesives. In particular, the polymeric material and the polymeric material composition are suitably used for optical materials, optical device components, and display device components. Specific examples of these applications include optical applications including lenses such as spectacle lenses, imaging lenses for cameras (e.g., (digital) cameras, cameras for mobile phones, and in-vehicle cameras), light beam condensing lenses, and light diffusing lenses, sealing materials for LEDs, optical adhesives, optical transmission bonding materials, filters, diffraction gratings, prisms, light guides, watch glass, and transparent glass and cover glass such as cover glass for display devices; optical-device applications including photosensors, photoswitches, LEDs, light emitting devices, optical waveguides, multiplexers, demultiplexers, disconnectors, optical dividers, and optical fiber adhesives; and display device applications including display element substrates for LCDs, organic ELs, PDPs, and the like, color filter substrates, touch panel substrates, display protective films, display backlights, light guide plates, antireflection films, and antifogging films.

The polymeric material and the polymeric material composition of the present invention also have excellent heat resistance, and are thus suitably used for heat resistant materials, ferroelectric materials, heat dissipating materials, separators for battery materials, filters including gas separation membranes and liquid separation membranes, and the like.

The polymeric material and the polymeric material composition of the present invention are preferably thermoplastic, easily molded and processed, and produced with excellent productivity.

The polymeric material and the polymeric material composition of the present invention can be suitably used as a molding material and can be suitably used as a thermoplastic polymeric material and a thermoplastic composition, respectively. The polymeric material and the polymeric material composition may be molded by any method, and non-limiting examples of the method include commonly known methods of processing thermoplastic resins, including injection molding, extrusion, a T-die method, and inflation. The polymeric material and the polymeric material composition may be molded into a desired shape by casting, application, or the like. Non-limiting examples of the shape include various known shapes including a lens, a sheet, and a film.

As described above, the polymeric material and the polymeric material composition of the present invention each have a high refractive index, low optical dispersibility, and reduced coloration in the visible light region. Therefore, they can be suitably used for optical applications and the like. They also can be produced at excellent productivity. Further, the method of producing the polymeric material of the present invention can easily provide the above-described polymeric material.

EXAMPLES

The present invention is described in more detail with reference to, but not limited to, examples. It should be noted that the terms "part(s)" and "%" refer to "part(s) by mass" and "% by mass", respectively, unless otherwise stated.

The following describes the measurement methods used in the EXAMPLES.

<Weight Average Molecular Weight (Mw), Number Average Molecular Weight (Mn), Degree of Dispersibility (Mw/Mn)>

The weight-average molecular weight and the number-average molecular weight of a polymer were determined by gel permeation chromatography (GPC) under the following conditions. The degree of dispersibility was calculated by dividing the weight average molecular weight by the number average molecular weight.

Apparatus: SHIMAZU, CBM-20A
Detector: differential refractive index detector (RI) (SHIMAZU, SPD-20MA) and UV-visible-infrared spectrophotometer (SHIMAZU, SPD-20MA)
Column: TOSOH, TSKgel SuperHM-N
Column temperature: 40° C.
Flow rate: 0.3 ml/min
Calibration curve: Polystyrene Standards
Eluent: chloroform <Elementary Analysis Measurement>

A sample prepared by applying 0.25 mL of a polymer solution to a silicon wafer by spin coating was used to measure the peak intensities derived from the 2p orbital of a sulfur atom and the is orbital of an oxygen atom using a photoelectron spectrometer (JPS-9010TR, XPS, light source: Mg, X-ray output: 400 W) available from JEOL Ltd. The integration ratio of the peak intensities was calculated to determine the O/S ratio. If necessary, the peak intensity derived from the is orbital of a carbon atom was also measured, and the result was also considered in the calculation of the O/S ratio.

As for the measurement method, binding energy position, and the like, Handbook of X-ray Photoelectron Spectroscopy (published by JEOL Ltd. in March 1991) was used as reference.

<Binding Energy>

A sample prepared by applying 0.25 mL of a polymer solution to a silicon wafer by spin coating was used to measure the binding energy from the peak position of the 2p3/2 orbital of a sulfur atom using a photoelectron spectrometer (JPS-9010TR, XPS) available from JEOL Ltd.

<Refractive Index>

A polymer solution or a polymeric material composition in an amount of 30 mg was dissolved in 1,1,2,2-tetrachloroethane (1 ml), and the solution was passed through a membrane filter with a pore size of 0.2 μm. A 0.4-ml portion of the filtrate was dropped on a glass substrate (2 cm ×2 cm) and cast into a 50-nm thick film. The film was subjected to measurement of the phase difference between polarization of incident light and transmitted light and the ratio of angle of deviation of reflected light using a spectroscopic ellipsometer UVISEL available from HORIBA Scientific. The wavelength (450 nm) and the incident angle) (75° of the incident light were previously set to determine a complex refractive index, and the refractive index at 190 to 2000 nm was calculated and the refractive index at a wavelength of 589.3 nm was determined.

<Abbe Number>

A 50-nm thick film was obtained as in the above-described measurement of refractive index. The film was subjected to measurement of refractive indexes using the D line (589.3 nm), the F line (486.1 nm), and the C line (656.3 nm) with a spectroscopic ellipsometer UVISEL available from HORIBA Scientific, and the Abbe number (VD) was calculated using the following calculating formula (A):

$$\text{Abbe number } (v_D) = (n_D - 1)/(n_F - n_C) \quad \text{(A)}$$

wherein $n_D$, $n_F$, and $n_C$ represent the refractive indexes at the Fraunhofer D line (589.3 nm), the Fraunhofer F line (486.1 nm), and the Fraunhofer C line (656.3 nm), respectively.

<Absorbance of Solution>

The absorbance at 200 to 800 nm was measured using an UV-visible-infrared spectrophotometer (V-700 series, cell: cell with an optical path length of 1 cm) available from JASCO Corporation. A solution of a polymer or polymeric material composition in a chloroform solution (0.01 mg/ml) was used as a sample solution.

<Glass Transition Temperature (Tg)>

The glass transition temperature was measured as follows: a DSC curve was created using a differential scanning calorimeter available from Seiko Instruments Inc. under the conditions that a-alumina was used as a reference and the temperature was increased from room temperature to 250° C. at a temperature-increasing rate of 10° C./min, and evaluation was performed base on the intersection of the baseline and the tangent line at the inflection point of the curve was evaluated.

<Transmittance of Thin Film>

The polymer was dissolved to about 5% in an organic solvent capable of dissolving the polymer to prepare a solution. Specifically, a polymer before oxidation of the main chain was dissolved in chloroform to 5 wt %, and a polymer after oxidation of the main chain was dissolved in hexafluoro-2-propanol to 5 wt %. The resulting solution was applied to a glass substrate having little absorption of visible light by spin coating at about 500 rpm for 60 seconds and dried at 100° C. for 10 minutes to form a 1-μm thick thin film. The transmittance of the thin film was measured with a spectrophotometer (UV-visible-infrared spectrophotometer V-700 series available from JASCO Corporation). The transmittance at 400 nm was compared with the average transmittance at 400 to 700 nm to evaluate the visible transmittance. Air was used as a control sample.

<Heat Resistance of Thin Film>

The thin film used for the evaluation of the transmittance was heated at 260° C. for 10 minutes, and the transmittance after the heating was measured by the same method as the above-described evaluation method of the transmittance of the thin film. A thin film having a small difference in transmittance before and after the heating and a higher visible transmittance is preferred because it has good heat resistance.

Example 1

Synthesis Example 1

<Synthesis of Monomer>

A 1000-ml conical beaker was charged with chloroform (300 ml), m-toluenethiol (24.8 g, 0.2 mol), and a solution of iodine (25.4 g, 0.1 mol) in methanol (300 ml), and the contents were stirred for one hour at room temperature. Then, an aqueous solution of sodium thiosulfate was added thereto, iodine was removed, and the solvent was distilled off. The reaction solution was dispersed in diethyl ether, and the dispersion was washed first with an aqueous hydrochloric acid solution (3% by mass), then with an aqueous sodium hydroxide solution (5% by mass), and finally with pure water through liquid-liquid extraction. The washed solution was dehydrated, subjected to removal of the solvent, and vacuum-dried to collect bis(3-methylphenyl)disulfide. The yield was 80%. The structure was confirmed by $^1$H-NMR, $^{13}$C-NMR, and FAB-MS.

Bis(3-methylphenyl)disulfide $^1$H-NMR (CD$_2$Cl$_2$, 500 MHz, ppm): δ=7.30 (s, 2H, Ph-H), 7.28 (d, 2H, Ph-H), 7.16 (t, 2H, Ph-H), 7.01 (d, 2H, Ph-H), 2.78 (s, 6H, methyl-H)

$^{13}$C-NMR (CD$_2$Cl$_2$, ppm): δ=139.5, 137.1, 129.2, 128.4, 128.3, 124.9, 21.4

Mass: m/z 245.7 (found), 246.4 (calcd).

[Chem. 16]

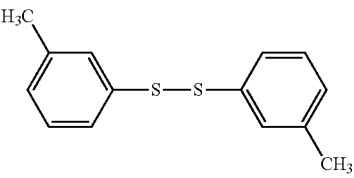

<Synthesis of Polymer>

In a 50 ml three-necked flask, diphenyl disulfide (3.64 g, 16.67 mmol) and bis(3-methylphenyl)disulfide (0.821 g, 3.33 mmol) obtained in the above-described <Synthesis of monomer> were added to a solution (20 ml) of 2,3-dichloro-5,6-dicyano-p-benzoquinone (DDQ, 1 M) and trifluoroacetic acid (1 M) in dichloromethane, followed by oxidative polymerization under stirring at room temperature for 20 hours. By-products were removed from the polymerization solution with a glass filter, the polymerization solution was added dropwise to hydrochloric acid-acidic methanol to precipitate the polymer produced, and the precipitate was separated by filtration with a glass filter and collected in the form of powder. Thereafter, the powder was first washed with an aqueous potassium hydroxide solution (0.1 M), then with pure water, and finally with methanol, followed by vacuum drying. Thus, a polymer A containing a repeating unit represented by the following formula (A) was obtained. The polymer A was identified by $^1$H-NMR and $^{13}$C-NMR. The polymer A had a weight average molecular weight Mw of 2700, a Mn of 1300, a glass transition temperature of 73° C., and a refractive index of 1.79. The XPS analysis of the polymer A showed that the elemental ratio (O/S) of oxygen atoms O to sulfur atoms S in the polymer A was 0.04 (0.04/1). The S—O binding energy was 162 to 164 eV. This indicated that S was 100% sulfide. The yield of the polymer A was 72%. The letter x in the formula (A) was 0.833.

Polymer A $^1$H-NMR (CD$_2$Cl$_2$, 500 MHz, ppm): δ=7.23 (m, 23H, Ph-H), 2.25 (s, 3H, methyl-H)

$^{13}$C-NMR (CD$_2$Cl$_2$, ppm): δ=141.2, 136.5, 134.1, 131.1, 127.9, 127.4, 20.7

[Chem. 17]

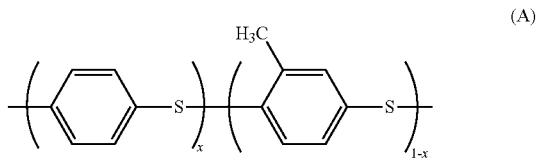

Oxidation Reaction of Polymer Main Chain

In a 50-ml recovery flask, the polymer A (0.302 g) obtained above was added to 10 mL of a solution of m-chloroperbenzoic acid (mCPBA, 0.25 M) in chloroform and was oxidized under stirring at room temperature for 20 hours. Then, the reaction solution was added dropwise to hydrochloric acid-acidic methanol, centrifuged, and vacuum-dried to obtain a polymer A-1 (thermoplastic polymeric material) containing a repeating unit represented by the formula (A-1). The yield of the polymer A-1 was 97%. The structure of the polymer was identified by $^1$H-NMR, IR, and XPS. The XPS analysis of the polymer A-1 showed that the elemental ratio (O/S) of oxygen atoms O to sulfur atoms S was 0.92 (0.92/1). As for the S—O binding energy, the peaks appeared at 165 eV and 163 eV, which were able to be separated into the peak at 164 to 168 eV (sulfoxide) and the peak at 162 to 168 eV (sulfide), respectively, by peak separation. The ratio of the peak area of sulfoxide to the peak area of sulfide was 47.8 to 4.4.

In the formula (A-1), x was 0.08 and y was 0.92.

Polymer A-1

$^1$H-NMR (CD$_2$Cl$_2$, 500 MHz, ppm): δ=7.55 (m, 23H, Ph-H), 2.34 (s, 3H, methyl-H)

IR (cm$^{-1}$): 1045 (νS=O)

[Chem. 18]

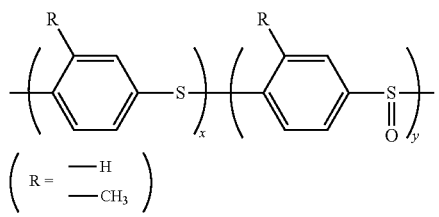

(A-1)

Example 2

The thermoplastic polymeric material A-1 (10 mg) obtained above and a zirconia nanoparticle dispersion (particle size: 11 nm, solids in a methyl ethyl ketone solution: 70%) (28.6 mg) were dissolved in 1 mL of 1,1,2,2-tetrachloroethane to obtain a thermoplastic composition (polymeric material composition).

Comparative Example 1

A thermoplastic polymeric material was obtained as in Example 1 except that the "Oxidation reaction of polymer main chain" was not carried out in Example 1. In other words, the polymer A of Example 1 corresponds to the thermoplastic polymeric material of Comparative Example 1.

Comparative Example 2

A thermoplastic polymeric material was obtained as in Example 1 except that the "Oxidation reaction of polymer main chain" was carried out in the following way in Example 1.

Oxidation Reaction B of Polymer Main Chain

In a 50-ml recovery flask, the polymer A (0.302 g) obtained above was added to 10 mL of a solution of m-chloroperbenzoic acid (mCPBA) in chloroform (1 M), and was oxidized under stirring at room temperature for 20 hours. Then, the reaction solution was added dropwise to hydrochloric acid-acidic methanol, centrifuged, and vacuum-dried to obtain a polymer B-1 (thermoplastic polymeric material) containing a repeating unit represented by the formula (B-1). The yield of the polymer B-1 was 104%. The structure of the polymer B-1 in the form of powder was identified by IR analysis. The IR analysis showed the peak derived from sulfoxide.

Polymer B-1

IR (cm$^{-1}$): 1155, 1325 (νO=S=O)

The polymer had a glass transition temperature of 159° C. The XPS analysis of the polymer showed that the elemental ratio (O/S) of oxygen atoms O to sulfur atoms S was 2.0 (2.0/1). The S—O binding energy was 168 to 170 eV (sulfonic acid).

[Chem. 19]

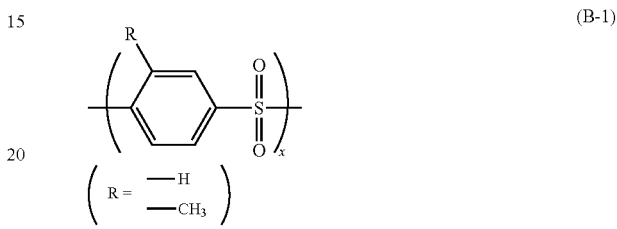

(B-1)

Table 1 shows the weight-average molecular weight (Mw), the number-average molecular weight (Mn), the molecular weight distribution (Mw/Mn), the O/S ratio, and the S—O binding energy of each of the polymer A (thermoplastic polymeric material of Comparative Example 1), the polymer A-1 (thermoplastic polymeric material of Example 1), and the polymer B-1 (thermoplastic polymeric material of Comparative Example 2) obtained in the above example and comparative examples.

The thermoplastic polymeric materials and the thermoplastic compositions (polymeric material compositions) obtained in the examples and comparative examples were subjected to measurement of refractive index, Abbe number, absorbance, and glass transition temperature (Tg) by the methods described above. Table 2 shows the results. In Comparative Example 2, the refractive index, Abbe number, and absorbance were unmeasurable because the thermoplastic polymeric material was insoluble in the solvent. The measurement data of the refractive index and absorbance of the thermoplastic polymeric materials obtained in Example 1 and Comparative Example 1 are shown in FIGS. 1 to 4.

TABLE 1

|  | Polymer A | Polymer A-1 | Polymer B-1 |
| --- | --- | --- | --- |
| Mw | 2700 | 2900 | —$^{Note)}$ |
| Mn | 1300 | 1400 | —$^{Note)}$ |
| Mw/Mn | 2.1 | 2.1 | —$^{Note)}$ |
| O/S ratio | 0.04/1 | 0.92/1 | 2.0/1 |
| S—O binding energy (eV) | 162 to 164 | 163 to 165 | 168 to 170 |

Note)
Polymer B-1 was insoluble in organic solvent, and thus, the molecular weight thereof was unmeasurable by GPC.

TABLE 2

|  | Refractive index ($n_D$) | Abbe number ($v_D$) | Absorbance (360 nm) | Tg (° C.) |
| --- | --- | --- | --- | --- |
| Example 1 | 1.73 | 19 | 0.0069 | 135 |
| Example 2 | 1.73 | 20 | 0.0025 | 135 |
| Comparative Example 1 | 1.79 | 17 | 0.012 | 73 |
| Comparative Example 2 | — | — | — | 158 |

Tables 1 and 2 demonstrate that the thermoplastic polymeric material having a sulfoxide structure in the main chain (Example 1) and the thermoplastic composition containing the above thermoplastic polymeric material (Example 2) had a refractive index which was slightly lower, but not lower than 1.69, a higher Abbe number, a lower absorbance value at a wavelength of 360 nm, and a lower coloration in the visible light region than the thermoplastic polymeric material having no sulfoxide structure in the main chain (Comparative Examples 1 and 2).

Example 3

<Synthesis of Polymer>

A polymer C was synthesized in the same manner as the synthesis of the polymer A of Example 1, except that in <Synthesis of polymer> in Example 1 only bis(3-methylphenyl)disulfide (10.92 g, 44.41 mmol) was used instead of diphenyl disulfide and bis(3-methylphenyl)disulfide and the reaction duration was set to 40 hours. The polymer C was identified by $^1$H-NMR and $^{13}$C-NMR. The polymer C had a weight average molecular weight Mw of 6500, a Mn of 1650, and a S—O binding energy of 162 to 164 eV. This indicated that S was 100% sulfide. The yield of the polymer C was 65%. The letter x in the formula (A) was 0.

Oxidation Reaction of Polymer Main Chain

In a 50-ml recovery flask, the polymer C (0.330 g) obtained above was added to 10 mL of a solution of m-chloroperbenzoic acid (mCPBA, 0.25 M) in chloroform, and was oxidized under stirring at room temperature for 20 hours. Then, the reaction solution was added dropwise to hydrochloric acid-acidic methanol, centrifuged, and vacuum-dried to obtain a polymer C-1 (thermoplastic polymeric material). The yield of the polymer C-1 was 96%. The structure of the polymer was identified by $^1$H-NMR, IR, and XPSs. The XPS analysis of the polymer C-1 showed that the elemental ratio (O/S) of oxygen atoms O to sulfur atoms S was 0.92 (0.92/1).

A thin film of the polymer A-1 obtained in Example 1 and a thin film of the polymer C-1 obtained in Example 3 were subjected to evaluation of transmittance and the transmittance after heating test by the above method. The same evaluation was performed for references using the polymer A (Comparative Example 1) before oxidation reaction and the polymer C (Comparative Example 3) before oxidation reaction. Table 3 shows the results.

TABLE 3

|  |  | Transmittance of thin film | | Transmittance of thin film after heating | |
| --- | --- | --- | --- | --- | --- |
|  |  | % 400 nm | % 400 to 700 nm on average | % 400 nm | % 400 to 700 nm on average |
| Example 1 | Polymer A-1 | 87.6 | 89.4 | 86.5 | 89.2 |
| Example 3 | Polymer C-1 | 87.3 | 89.9 | 82.3 | 87.5 |
| Comparative Example 1 | Polymer A | 84.2 | 87.1 | 81.9 | 87.0 |
| Comparative Example 3 | Polymer C | 83.0 | 87.7 | 77.9 | 87.3 |

Table 3 demonstrated that the polymers having a sulfoxide structure (—S(=O)) of the examples had a higher transmittance in the visible light region, a smaller difference in transmittance before and after heating, and better heat resistance than the polymers having only a sulfide structure (—S—) of the comparative examples.

Example 4

(Synthesis of Bromo-Containing Polymer D)

In a 300 mL three-necked flask, poly(2,6-dimethyldisulfide) (PMPS, 2.7242 g, 20 mmol, 0.2 M) was dissolved in chlorobenzene (100 mL). Subsequently, N-bromosuccinimide (NBS, 3.5998 g, 20 mmol, 1 eq. for PMPS) and azoisobutyronitrile (AIBN, 98.526 mg, 0.6 mmol, 0.03 eq. for PMPS) were added thereto, and nitrogen was passed (bubbled) through the contents at room temperature for 30 minutes. Thereafter, the temperature was raised to 80° C. and the contents were refluxed under a nitrogen atmosphere for five hours. After the completion of the reaction, the reaction product was cooled in an ice bath so that substances derived from NBS were precipitated, and the precipitates were separated by filtration. Subsequently, the collected filtrate was concentrated with an evaporator, and then added dropwise to hydrochloric acid-acidic methanol (MeOH 800 mL/HCl aq. 5 vol %) to carry out purification by precipitation. The precipitates were collected by centrifugation and dried under reduced pressure. Thus, a polymer D was obtained as a pale yellow powder (yield: 89%).

Oxidation Reaction of Polymer Main Chain

In a 50-mL flask, the polymer D (0.98481 g, 5.0 mmol, 0.25 M) was dissolved in chloroform (20 mL). Subsequently, 1 equivalent of mCPBA was added thereto and the reaction was carried out at room temperature in the air for 20 hours. After the completion of the reaction, chloroform was added to the reaction solution to disperse precipitates. The dispersion was added dropwise to hydrochloric acid-acidic methanol (MeOH 600 mL/HCl aq. 5 vol %) to carry out purification by precipitation. The precipitates were collected by centrifugation and dried under reduced pressure. Thus, a polymer D-1 was obtained as a white powder (yield: 77%, which was calculated based on the reaction rate of mCPBA taken as 100%).

(Synthesis of Hydroxy Group-Containing Polymer D-1-1)

In a 50-mL flask, the polymer D-1 (0.42003 g, 2.0 mmol, 0.2 M) was dissolved in N-methyl-2-pyrrolidone (NMP, 10 mL). Subsequently, H$_2$O (1 mL, 10 vol % for NMP) was added thereto and the contents were heated to reflux at 100° C. for 90 hours. After the completion of the reaction, the reaction solution was added dropwise to hydrochloric acid-acidic methanol (MeOH 500 mL/HCl aq. 5 vol %) to carry out purification by precipitation. The precipitates were collected by centrifugation and dried under reduced pressure. Thus, a polymer D-1-1 was obtained as a pale brown to grayish white powder (yield: 78%, which was calculated assuming that 100% of the bromo groups were replaced by hydroxy groups).

As for each polymer, the amounts of SO and SO$_2$ were determined by infrared absorption spectroscopy (IR), and the amounts of OH, Br, and CH$_3$ were determined by $^1$H-NMR.

As for each polymer, the glass transition temperature (Tg), the refractive index (n$_D$) at the Fraunhofer D line (589.3 nm), and the Abbe number (v$_D$) were evaluated by the above-described methods. Table 4 shows the results.

Experimental Examples 1 to 4

(Hybridization of Hydroxy Group-Containing Polymer D-1-1 with $TiO_2$)

In a 10-mL sample bottle, the polymer D-1-1 (20 mg, 0.03 M) was dissolved in dimethylacetamide (DMAc, 4 mL), and hydrochloric acid ([HCl]/[Ti]=2) was added thereto and stirred for 30 minutes. Subsequently, a solution of tetrabutyl orthotitanate in butanol (1.47 M solution of Ti) was added to the polymer D-1-1 according to the formulation (by mass) shown in Table 5, and stirred for an additional 30 minutes to prepare a hybrid solution (polymeric material composition).

Figure 5:
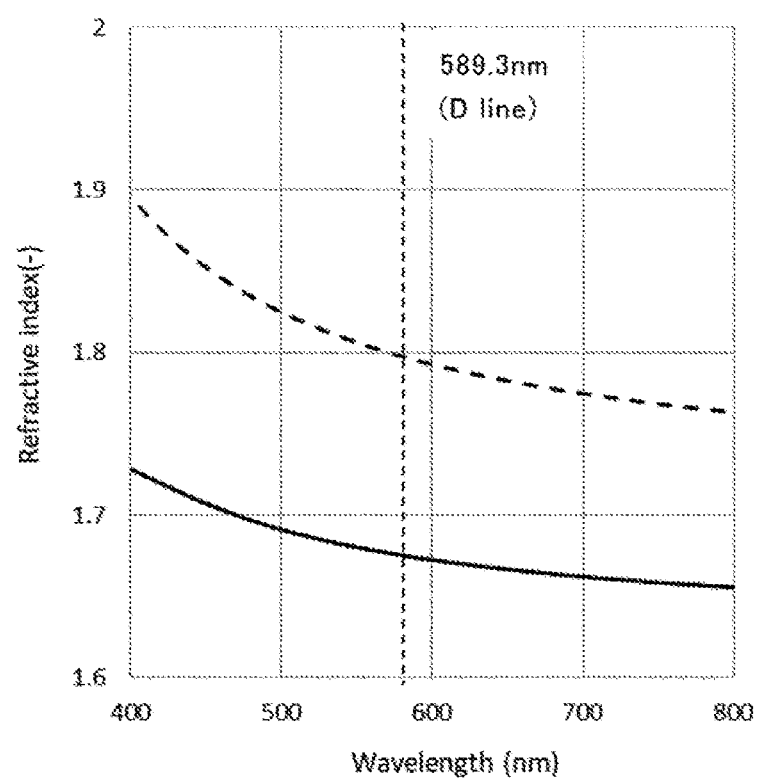
FIG. 5 is a diagram showing measurement data of the refractive indexes of polymeric material compositions of Experimental Examples 1 and 4.

The hybrid solution was applied to a glass substrate by drop casting or to a silicon wafer by spin coating to prepare films each having a thickness described in Table 5. Each film was heated and dried for two hours at 60° C. and for one hour at 150° C. under reduced pressure to form hybrid films. Each hybrid film was subjected to evaluation of absorbance at 400 nm relative to its thickness, refractive index ($n_D$) at the Fraunhofer D line (589.3 nm), and Abbe number ($v_D$) by the above-described methods. Table 5 shows the results. FIG. 5 is a diagram showing measurement data of the refractive indexes of the polymeric material compositions of Experiment Examples 1 and 4 in the EXAMPLES. In the figure, the solid line indicates Experiment Example 1 and the broken line indicates Experiment Example 4.

Figure 6:
FIG. 6 is a photograph of hybrid films obtained in Experimental Examples 1 to 4.

FIG. 6 shows a photograph of the hybrid films obtained in Experimental Examples 1 to 4 in the EXAMPLES.

TABLE 4

|  | Main chain | | Side chain | | | Tg | | |
| --- | --- | --- | --- | --- | --- | --- | --- | --- |
|  | % (SO) | % ($SO_2$) | % (OH) | % (Br) | % ($CH_3$) | (° C.) | $n_D$ | $v_D$ |
| PMPS | 0 | 0 | 0 | 0 | 200 | 150 | 1.69 | 21 |
| Polymer D | 0 | 0 | 0 | 78 | 122 | 172 | 1.72 | 20 |
| Polymer D-1 | 49 | 20 | 0 | 78 | 122 | —Note) | 1.68 | 20 |
| Polymer D-1-1 | 49 | 20 | 73 | 5 | 122 | —Note) | 1.67 | 24 |

Note)
Decomposition temperature was unclear.

TABLE 5

| Experimental Example | $TiO_2$ Amount (% by weight) | Film thickness (μm) | Absorbance/ thickness (400 nm) (×$10^2$ μm$^{-1}$) | $n_D$ | $v_D$ |
| --- | --- | --- | --- | --- | --- |
| 1 | — | 5 | 0.8 | 1.67 | 24 |
| 2 | 10 | 3 | 1.4 | 1.73 | 24 |
| 3 | 20 | 1 | 2.7 | 1.77 | 19 |
| 4 | 30 | 0.9 | 4.6 | 1.8 | 16 |

Table 5 demonstrated that the polymeric material composition containing any of the polymeric materials of the examples and a metal oxide had high transparency with reduced coloration in the visible light region, a high refractive index, and low optical dispersion.

The invention claimed is:

1. An optical material comprising:
   a polymer that comprises a sulfoxide structure in a main chain, and a substituted aromatic ring structure in the main chain,
   wherein the main chain of the polymer comprises a constituent unit (A) represented by the following formula (1):

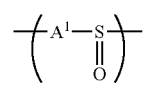

(1)

wherein $A^1$ is a substituted divalent aromatic hydrocarbon group that is selected from the group consisting of a phenylene group, a naphthylene group, an anthrylene group, a biphenylene group, and a triphenylene group, and
   wherein a substituent of the substituted divalent aromatic hydrocarbon group is selected from the group consisting of a halogen atom, a hydroxy group, an optionally substituted C1-C18 alkyl group, an optionally substituted C1-C18 alkoxy group, an optionally substituted aryl group, an optionally substituted aralkyl group, and an optionally substituted sulfur-containing substituent and wherein the optical material has an Abbe number in the range of 10 or greater and an Abbe number in the range of 60 or less.

2. The optical material according to claim 1,
   wherein the constituent unit (A) represented by the formula (1) is a constituent unit represented by the following formula (1-1):

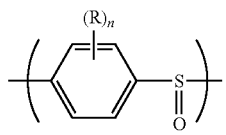

(1-1)

wherein each R is the same as or different from each other and is a halogen atom, a hydroxy group, an optionally substituted C1-C18 alkyl group, an optionally substituted C1-C18 alkoxy group, an optionally substituted aryl group, an optionally substituted aralkyl group, or an optionally substituted sulfur-containing substituent; and n represents a number of Rs and is an integer of 1 to 4.

3. The optical material according to claim 1, wherein the optical material has an elemental ratio of oxygen atoms O to sulfur atoms S (O/S) in a range of 0.1 to 1.5.

4. The optical material according to claim 1, wherein the optical material has a glass transition temperature in a range of 80° C. to 250° C.

5. The optical material according to claim 1, wherein the optical material is a thermoplastic polymeric material.

6. An optical material composition comprising:
the optical material according to claim 1; and
a metal oxide.

7. The optical material composition of claim 6, wherein the metal oxide is at least one selected from the group consisting of a titanium oxide, a silicon dioxide, a zirconium oxide, an aluminum oxide, a magnesium oxide, a perovskite-type oxide, a boron nitride, an aluminum hydroxide, and an aluminum titanate.

8. The optical material composition of claim 6, wherein the metal oxide has an average particle size in a range of 1 nm to 50 nm.

9. A method of producing the optical material according to claim 1, comprising:
polymerizing a monomer component comprising a sulfur-containing monomer to obtain a sulfur-containing polymer; and
oxidizing the sulfur-containing polymer using an oxidant, the oxidant comprising at least one selected from the group consisting of a peroxide and a chloric acid.

10. The optical material according to claim 1, wherein a proportion of the constituent unit (A) represented by the formula (1) based on 100% by mass of all constituents of the polymer is in a range of 1 to 80% by mass.

* * * * *